United States Patent Office 2,965,672
Patented Dec. 20, 1960

2,965,672

DIALKYLAMINOALKYL CARBANILATES AND DERIVATIVES THEREOF

William A. Lott, Maplewood, N.J., assignor to Olin Mathieson Chemical Corporation, New York, N.Y., a corporation of Virginia No Drawing. Filed Jan. 22, 1957, Ser. No. 635,110

2 Claims. (Cl. 260—472)

This invention relates to, and has for its object the provision of: (A) bases of the general formula

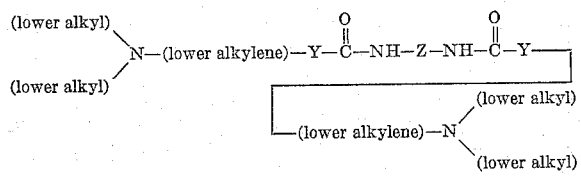

wherein Y is a member of the class consisting of NH, N (lower alkyl), and O; and Z is a radical selected from the class consisting of

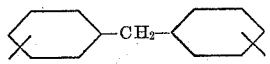

and

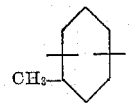

(B) acid-addition salts thereof; (C) quaternary ammonium salts thereof; and (D), methods of preparing them.

Examples of acid-addition salts of the free base compounds of this invention include the mineral acid salts, such as the hydrohalides (e.g. hydrochloride, hydrobromide and hydroiodide), the sulfate, and the phosphate; and the organic acid salts, such as the acetate, citrate, tartrate, oxalate, ascorbate and succinate. Included by the term "acid-addition salts" within the purview of this invention are the mono-acid-addition salts as well as the di-acid-addition salts.

The compounds of this invention may be prepared by the method essentially comprising interacting (I) compounds of the general formula

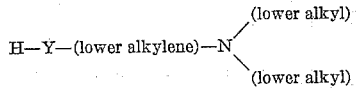

wherein Y is as hereinbefore defined, with (II) a member of the class consisting of methylenebisphenylisocyanates,

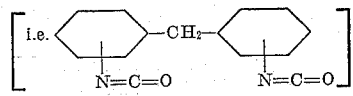

and diisocyanatotoluenes,

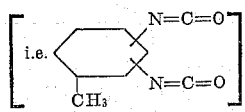

Examples of reactants (I) utilizable for the purposes of this invention, include, 2-diethylaminoethanol, 3-diethylaminopropanol, 2-diethylaminoisopropanol, 4-diethylaminobutanol, 2-dipropylaminoethanol, 3-dipropylaminopropanol, 2 - di(isopropyl) - aminoethanol, 2 - dimethylaminoethanol, 4-dimethylaminobutanol, 2-dibutylaminoethanol, 3-dibutylaminopropanol, 2-dimethyaminoethylamine, 3-dimethylaminopropylamine, 2-dimethylaminoiso-propylamine, 4-dimethylaminobutylamine, 2-diethylaminoethylamine, diethylaminoethylmethylamine [N,N-diethyl-N'-methyl-ethylene diamine] and 3-diethylaminopropylamine. Examples of reactants (II) utilizable for the purposes of this invention include p,p'-diisocyanatodiphenylmethane and m-toluene diisocyanate.

To form the acid-addition salts, the free base (A) is treated with the desired acid. The nature of the salt formed will depend on the ratio of acid to base. If one equivalent of acid is present per mole of base, a mono-acid-addition salt is the major product formed. If two equivalents of acid are present per mole of base, a di-acid-addition salt is the product.

By the addition to the free base (A) of alkyl halides, dialkyl sulfates, aralkyl halides, aryl halides, or the like, there are obtained in the usual manner quaternary ammonium salts.

The compounds of this invention are useful as reagents for the precipitation of penicillins (e.g. penicillin G) from aqueous solutions and hence can be employed in the separation of penicillins from the filtrates of the fermentation broth in which they are produced. The compounds of this invention are also useful as agricultural fungicides in the treatment and prevention of pathogenic fungi infections such as brown rot, which effects peaches, plums and other stone fruits. For this purpose the compounds of this invention are applied as aqueous sprays containing about 10–100 parts per million of active ingredient.

The following examples are illustrative, but by no means limitative, of the invention (all temperatures being in Centigrade):

EXAMPLE I

*4,4'-methylenedicarbanilic acid, diester with 2-diethylaminoethanol, dihydrochloride*

(a) *4,4'-methylenedicarbanilic acid, diester with 2-diethylaminoethanol.*—To a solution of 32.5 g. (0.30 mole) of 2-diethylaminoethanol in 250 ml. of dry benzene maintained at 2.5–5° C. with an ice bath is added dropwise (two hours), with vigorous stirring, 25.0 g. (0.10 mole) of p,p'-diisocyanatodiphenyl-methane (freshly distilled) in 100 ml. of dry benzene. The ice bath is removed and the solution stirred for two hours at room temperature and for three hours at reflux temperature. A small amount of benzene-insoluble material is filtered from the cooled solution and with cooling continued (ice bath), 200 ml. of 1.75 N (0.35 mol) hydrochloric acid is added. The two layers are shaken and separated; the aqueous phase is then extracted with two 200 ml. portions of benzene and made basic with a gradually added solution of 55.3 g. (0.40 mole) of potassium carbonate in 200 ml. of water. The liberated product is taken up into 250 ml. of chloroform and the aqueous phase extracted twice with additional 200 ml. portions. The combined extracts are dried over magnesium sulphate and after the chloroform is removed under reduced pressure (ca. 100 mm.), 50 ml. of chlorobenzene is added and removed on the steam bath at 10 mm. The residue weighs about 50.9 g.

(b) *4,4'-methylenedicarbanilic acid, diester with 2-diethylaminoethanol, dihydrochloride.*—The crude free base (50.9 g) is dissolved in 500 ml. of anhydrous ether; and after cooling (ice bath), a small amount of flocculent precipitate is filtered off. The filtrate is returned to the cooling bath and etherael hydrogen chloride is added dropwise with stirring until a drop of the ether solution is acid to moistened Congo red paper. The product, upon filtering, washing copiously with anhydrous ether, and drying under reduced pressure (vacuum desiccator) weighs about 44.1 g. (about 79%). This product after recrystallization from 300 ml. of dry isopropanol melts at about 164–165° C. (dec.); the melting point remains constant upon a second recrystallization from 275 ml. of dry isopropanol. Yield about 31.0 g. (approximately 55% overall).

EXAMPLE 2

*4,4'-methylenedicarbanilic acid, diamide with 2-diethylaminoethylamine*

To a vigorously stirred solution of 25.6 g. (0.22 mole) of 2-diethylaminoethylamine in 500 ml. of dry hexane maintained at 0–5° C. is added dropwise (1.5 hours) 25.0 g. (0.10 mole) of diisocyanatodiphenylmethane in 50 ml. of dry dioxane. The cooling bath is removed and stirring continued for three hours during time the reaction mixture gradually rises to room temperature. The gummy product is filtered, washed with two small portions of hexane, and dried under reduced pressure in a vacuum desiccator. Repeated recrystallization from the minimum amount of dry acetonitrile yields a crystalline product melting at about 145–146° C. (dec.); yield about 25.3 g. (about 52%).

EXAMPLE 3

*4,4'-methylenedicarbanilic acid, diamide with 2-diethylaminoethylamine, dimethiodide*

To a solution of 24.1 grams (0.05 mole) of 4,4'-methylenedicarbanilic acid, diamide with 2-diethylaminoethylamine in 250 ml. of anhydrous benzyl alcohol, there is added 28 grams (0.2 mole) of methyl iodide, and the reaction mixture is heated at 50° C. for 36 hours. The excess methyl iodide and benzyl alcohol are removed by distillation (reduced pressure to remove the benzyl alcohol), and the oily residue is solidified by trituration with anhydrous ether. The solid is filtered and recrystallized from acetonitrile.

EXAMPLE 4

*4,4'-methylenedicarbanilic acid, diamide with diethylaminoethylmethylamine, dihydrochloride*

(a) *4,4'-methylenedicarbanilic acid, diamide with diethylaminoethylmethylamine.*—A solution of 65 grams (0.5 mole) of diethylaminoethylmethylamine in one liter of anhydrous hexane is cooled to 5° C. and, with vigorous stirring there is added dropwise over the course of two hours a solution of 50 grams (0.2 mole) of p,p'-diisocyanatodiphenylmethane in 100 ml. of anhydrous dioxane. After the addition is complete, the cooling bath is removed and the reaction mixture allowed to warm to room temperature, vigorous stirring being continued for an additional three hours. The insoluble material is filtered, washed thoroughly with anhydrous hexane to remove unreacted amine and crystallized from anhydrous acetonitrile.

(b) *4,4'-methylenedicarbanilic acid, diamide with diethylaminoethylmethylamine, dihydrochloride.* — The product is converted to the dihydrochloride by dissolving 51 grams of the recrystallized solid in 500 ml. of anhydrous alcohol and adding 100 ml. of a 2 N alcoholic hydrogen chloride solution. The precipitation of the dihydrochloride is completed by the addition of anhydrous ether. The solid is then filtered, washed thoroughly with anhydrous ether and dried. Although this dihydrochloride is sufficiently pure, as precipitated, for conversion to the pinicillin salt, it may be recrystallized from dry isopropanol.

EXAMPLE 5

*Toluent-2,4-dicarbamic acid, diester with 2-diethylaminoethanol, dihydrochloride*

(a) *Toluene-2,4-dicarbamic acid, diester with 2-diethylaminoethanol.*—To a solution of 35.2 g. (0.30 mole) of 2-diethylaminoethanol in 250 ml. of dry benzene, maintained at 0–5° C. with an ice bath, is added dropwise (one hour), with vigorous stirring, 17.4 g. (0.10 mole) of m-toluene diisocyanate in 50 ml. of dry hexane. The reaction mixture is stirred ½ hour, the ice bath then removed and stirring continued for an additional ½ hour after which it is refluxed for three hours. The cooled benzene solution is shaken with 256 ml. of 5% hydrochloric acid (0.35 mole), separated, and the aqueous phase extracted with 250 ml. portions of benzene. The cold aqueous solution is then made basic with 400 ml. (0.4 mole) of a molar solution of potassium carbonate and the liberated ester extracted with three 250 ml. portions of ether. After drying over magnesium sulfate the combined ether extracts are evaporated on the steam bath to dryness, and the residue dissolved in 50 ml. of dry toluene twice, the toluene being removed each time under reduced pressure on the steam bath. The yield of product is about 35.5 g. (about 87%).

(b) *Toluene-2,4-dicarbamic acid, diester with 2-diethylaminoethanol, dihydrochloride.*—To 34.0 g. (0.08 mole) of the free base in 500 ml. of anhydrous ether is slowly added 40.0 ml. (0.19 mole) of 4.7 N alcoholic hydrogen chloride with stirring and cooling (ice bath). Although the product precipitates as a gum, it readily crystallizes on scratching with a stirring rod under several changes of anyhdrous ether. The strongly hygroscopic product is washed with anhydrous ether several times by decantation, and the slurry remaining after the final decantation is rapidly poured into a dish and dried in a vacuum desiccator under reduced pressure, M.P. about 182° (dec.), yield about 37.0 g. (about 95%). After two recrystallizations from the minimum amount (ca. 25 ml./g.) of a 1:1 mixture of isopropanol and n-propanol, the product melts at about 187° (dec.); yield about 33.2 g.

EXAMPLE 6

*Toluene-2,4-dicarbamic acid, diester with 2-diethylaminoethanol, dimethiodide*

To a solution of 20.4 g. (0.05 mole) of toluene-2,4-dicarbamic acid, diester with 2-diethylaminonethanol in 200 ml. of anhydrous acetone there is added, portionwise, 28 g. (0.2 mole) of methyl iodide and the reaction mixture refluxed for twenty-four hours. The excess methyl iodide and acetone are removed by distillation and the crude dimethiodide suspended in anhydrous ether and filtered. The dimethiodide is purified by crystallization from acetonitrile.

The invention may be variously otherwise embodied within the scope of the appended claims.

I claim:

1. The di(diethylaminoethyl)ester of 4,4'-methylene-dicarbanilic acid.
2. The dihydrochloride of the base defined by claim 1.

References Cited in the file of this patent

UNITED STATES PATENTS

| | | |
|---|---|---|
| 2,033,740 | Rider | Mar. 10, 1936 |
| 2,050,557 | Bockmuhl et al. | Aug. 11, 1936 |
| 2,551,378 | Kirby | May 1, 1951 |
| 2,573,586 | McCombie et al. | Oct. 30, 1951 |
| 2,700,039 | Ehrhart et al. | Jan. 18, 1955 |

OTHER REFERENCES

Moore: J. Am. Pharm. Assoc., XXXIII, 197–8 (1944).
Hager et al.: J. Am. Pharm. Assoc., XLV 411 to 413 (1956).